United States Patent [19]

Wally

[11] Patent Number: 4,582,406
[45] Date of Patent: Apr. 15, 1986

[54] PHOTOREPRODUCTION APPARATUS WITH PULSED LIGHT PROJECTOR SOURCE

[75] Inventor: Joseph H. Wally, Shawnee Mission, Kans.

[73] Assignee: Opti-Copy, Inc., Lenexa, Kans.

[21] Appl. No.: 533,994

[22] Filed: Apr. 19, 1984

Related U.S. Application Data

[63] Continuation of Ser. No. 317,776, Nov. 3, 1981, abandoned.

[51] Int. Cl.[4] ............................................. G03B 21/16
[52] U.S. Cl. ....................................... 353/57; 353/55; 353/61
[58] Field of Search ....................... 353/55, 57, 61, 52, 353/58, 60, 56, 85, 87; 355/30, 67; 352/202, 143; 362/294

[56] References Cited

U.S. PATENT DOCUMENTS 2,880,647  4/1959  Swinnerton ........................... 353/61
4,453,810  6/1984  Curie ..................................... 353/55

*Primary Examiner*—Harry N. Haroian
*Attorney, Agent, or Firm*—Kokjer, Kircher, Bradley, Wharton, Bowman & Johnson

[57] ABSTRACT

An image projector has a pulsed or similar light source of high intensity and high heat emission housed in an opaque box having a light-diffusing glass panel in its forward side which is spaced behind a vacuum film-holding plate having a glass center. Between the box light and the film-holding plate is a compartment which is open on the front and back and is sandwiched between the light diffusing glass panel of the box light and the film-holding plate such that no light escapes into the room. Said compartment thus comprises an isolation chamber which passes light to the film but not heat. The box light and the isolation chamber each has its own blower system and independent, specially baffled vents such that air between the two does not intermix. The vents are so designed as to permit discharge of the air but inhibit the egress of light therethrough.

18 Claims, 12 Drawing Figures

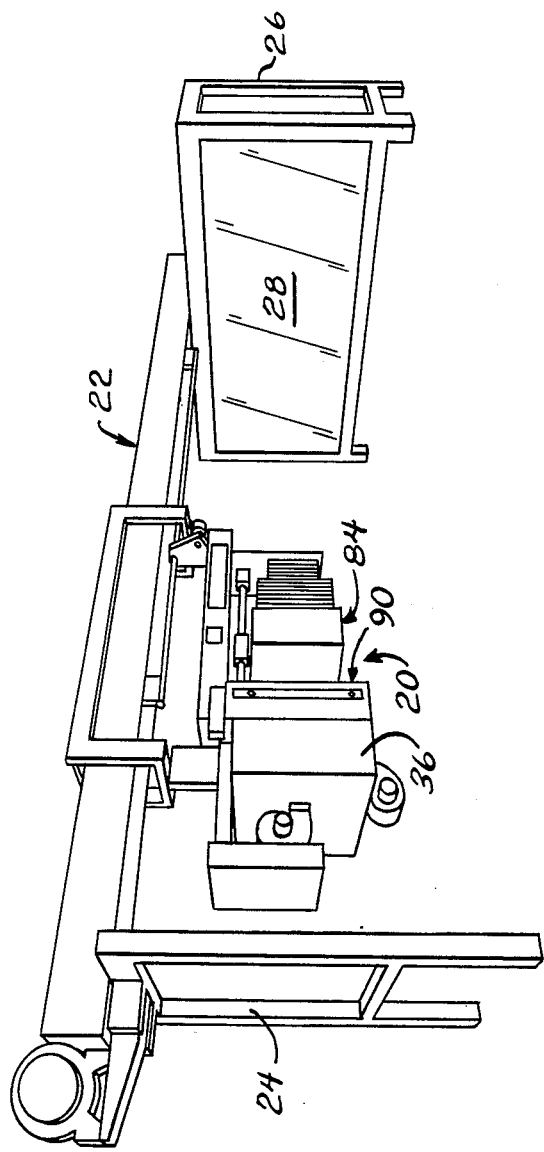
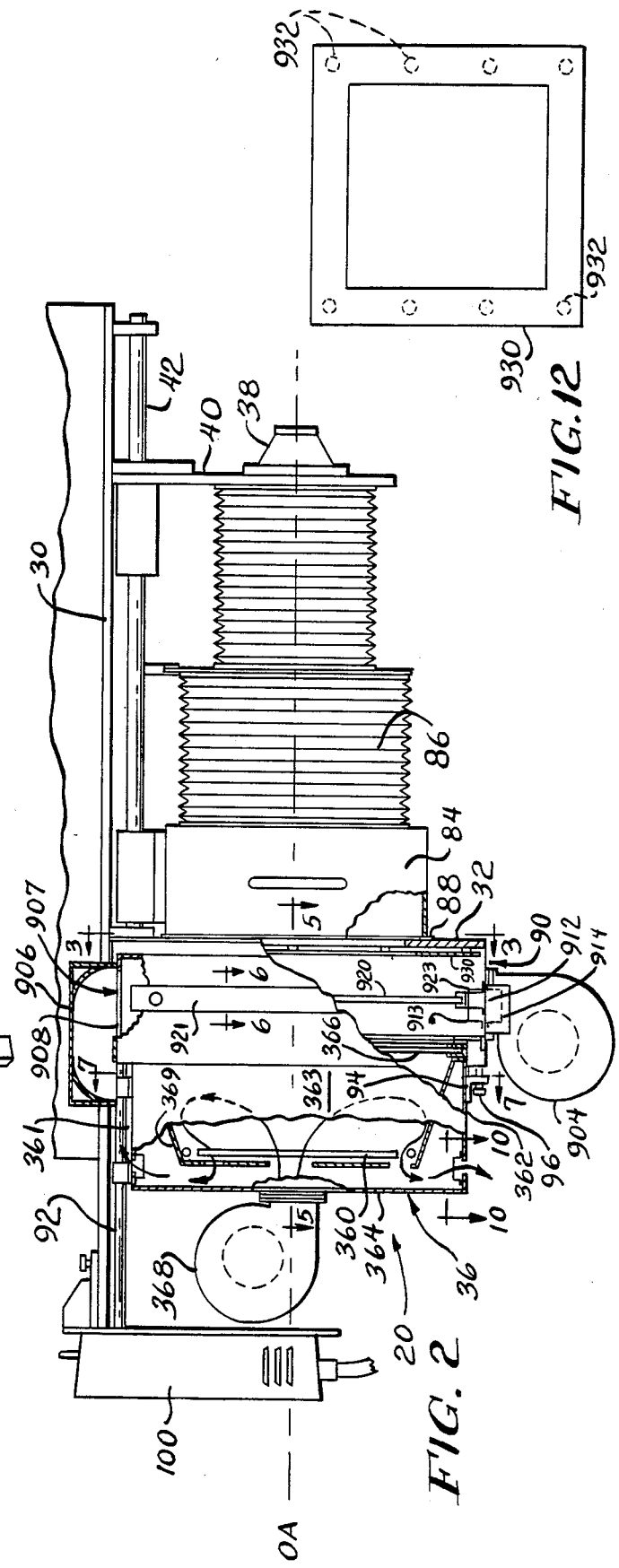

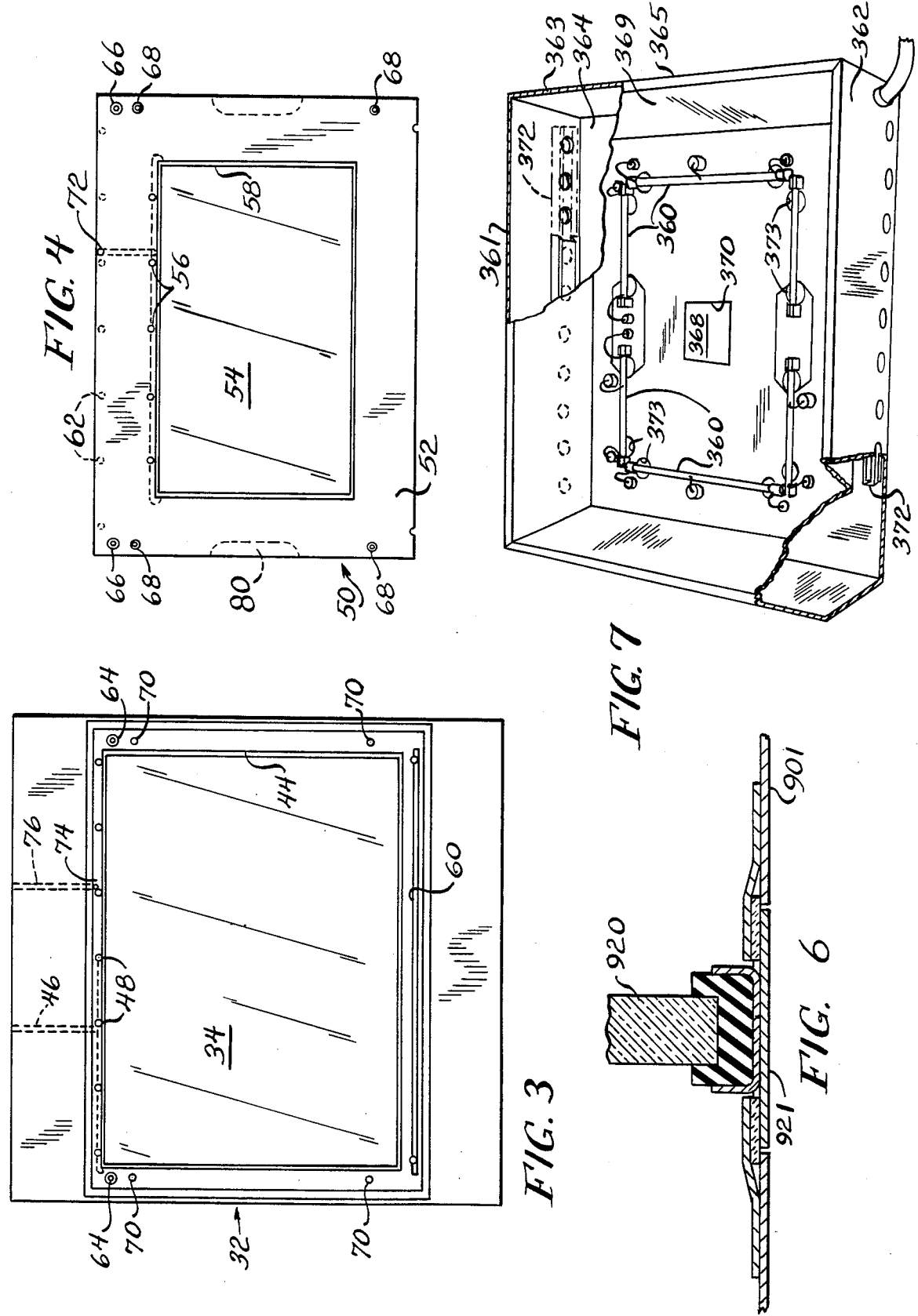

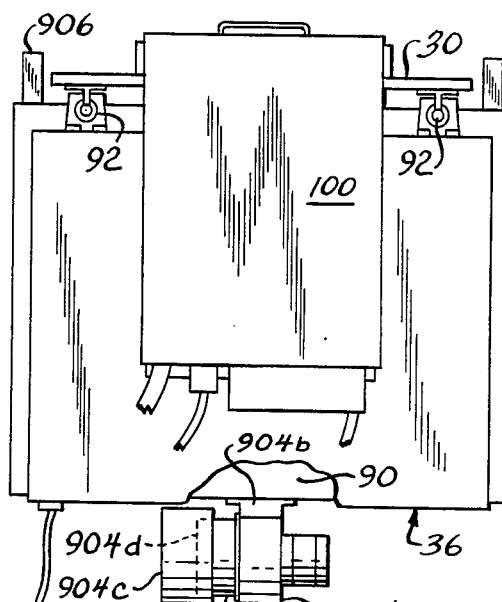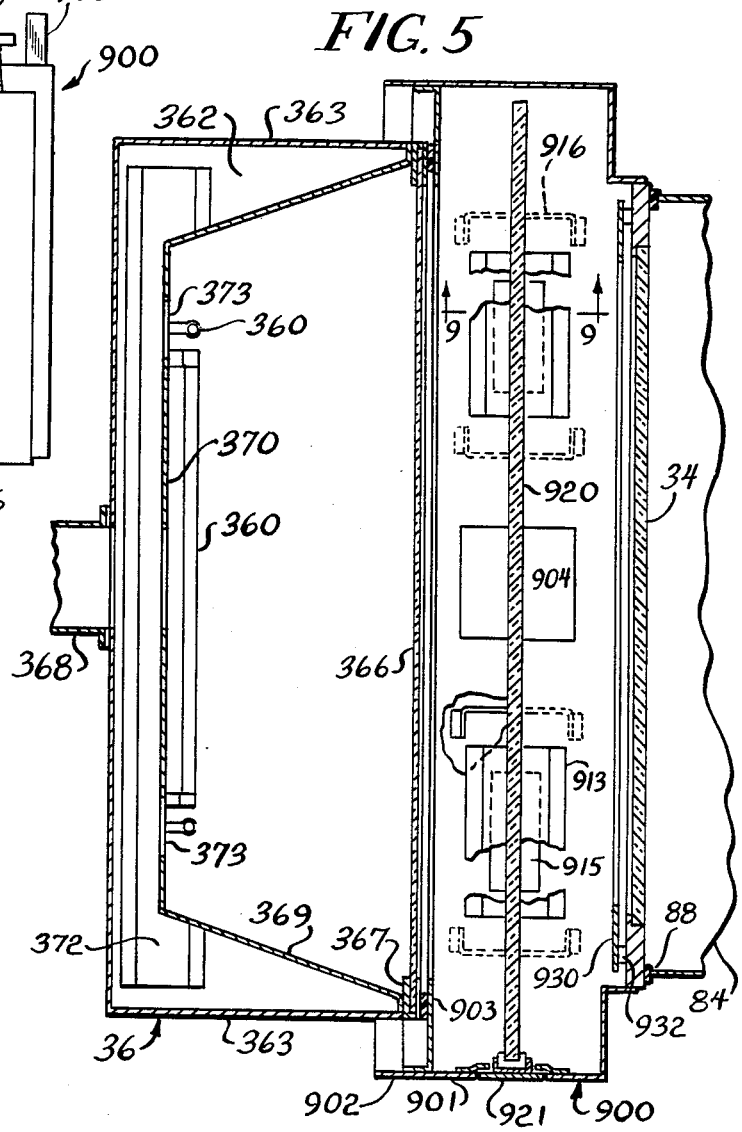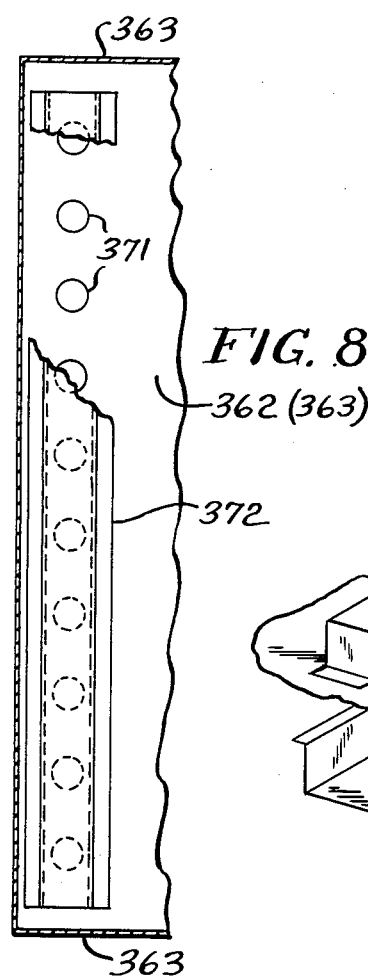

PHOTOREPRODUCTION APPARATUS WITH PULSED LIGHT PROJECTOR SOURCE

This is a continuation of application Ser. No. 317,776, filed 11-3-81 now abandoned.

This invention relates to photoreproduction apparatus such as imaging projectors and camera/projectors which are used in photocopying graphic sheet material and the like. More particularly, the invention comprises a novel and improved projection box light and ventilating means therefor.

BACKGROUND OF THE INVENTION

In such apparatus, back lighting of the subject to be imaged usually has taken one of two forms or systems. In the first and more popular system, glass condenser lenses are employed in conjunction with a light source to collimate the light rays which are collected and focused by the objective onto the easel which holds the sensitized material or screen. In the alternative system, a light diffuser comprising either a sheet of opal glass or white translucent plastic is positioned between the light source and the material to be imaged.

Projection through condensers has been preferred because of the greater concentration of light with corresponding increased contrast and sharpness of image. In diffuse light projectors particularly those using pulsed xenon lamps, the high intensity of heat which accompanies the required light intensity has been a problem. Also, the condenser lenses when used with a point source light are incapable of covering as large an image area. In image projection for industrial purposes the availability of a large image in the negative becomes critical. For example, in the billboard industry where 150 line half tone film color separations may reach the size of 17 by 35 inches or even 26 by 35 inches, both of these sizes have to be blown up by a factor of 2.0 diameters to 5.0 diameters or even more. This must be done without sacrifice of dot quality. Obviously films as large as these cannot be enlarged with condenser projection because condensers that large are not presently available in the market place. There is also the problem of cost which places a practical limit on how large condensers can be made.

Photographic box lights which house pulsed xenon sources lamps have been used to backlight transparencies held in the subject holder of conventional two room "engraving" cameras. However, they have not lent themselves to use as a true projection source light in a single room projection operation where the source light, the film being projected, the objective lens, the necessary trackages and the easel which holds the sensitized material comprise an entity within four unpartitioned walls. This has been due to the problems of stray light leakage, overheating and operator eye safety.

Pulsed xenon source lamps of appropriate light intensity generate a tremendous amount of heat. This heat must be quickly and consistently dispelled with a fan or blower system which is either built into the cabinet which houses the lamps or is connected therewith by flexible hoses or other duct work. The air forced into the cabinet must also be allowed to escape. For this purpose, there must be adequate venting. Simple holes or louvers which comprise escape routes for the air make for an excessive amount of light leakage. This escaping light can be sufficient to create a light level in a dark room which cannot be tolerated if light sensitive materials are not to be light-struck.

The heat generated in a boxlight by such lamps is so intense that much of the box cannot be safely touched after it has been in operation only a few minutes. If a glass and metal film holder is placed in front of the boxlight close enough to transilluminate the image so that it can be photographed or projected, the film holder will experience a sharp temperature rise. For example, a black anodized aluminum frame and the glass it surrounds placed 6 inches in front of a 6000 watt box light have been found to undergo a 10° F. temperature increase in 120 seconds from a "standing start" at room temperature. Such an increase is sufficient to change the dimensions of a film negative during its exposure with resultant blurring of the projected image and making the size of sequentially related images difficult to maintain. This potential size change becomes critical in a step-and-repeat operation, most often used in conjunction with a four color process where the congruent images must be of the same size if the half tones are to "rosette" properly over the expanse of a large press sheet.

Pulsed xenon light is an intense white light with a color temperature of about 6000 angstroms rich in ultra violet and infrared. It is unsuitable for any except very limited viewing with the human eye.

SUMMARY OF THE INVENTION

A principal object of this invention is to provide structure dealing with the above-enumerated problems which make it practical to use xenon or other high output light sources as controlled, temperature; stable and safe projection means.

A companion object of the invention is to make it possible to project larger film images with box light than is possible with the largest available condenser-equipped systems.

Other features of the invention include:
(a) The color temperature of the xenon source which becomes practical to use makes projected images of superior line quality over those utilizing cold cathode sources or banks of fluorescent tubes.
(b) Utilization of the xenon source light also permits very short exposures which are shorter exposures, faster than with other diffuse light sources, and thus to be preferred.
(c) The largest film negative miniatures made practical with xenon are easier to retouch and opaque.
(d) Another obvious advantage realized from using larger negative sizes arises out of the axiom that, all other factors being equal, the larger the negative the better the image in the final blowback.

In accordance with this invention, the above objects and features are obtained in an image projector by locating an isolation chamber between the light diffusing panel of a typical boxlight containing xenon or other light source of high heat and light intensity and the transparent platen of the film holder which is illuminated by the boxlight. The isolation chamber thus defined contains a heat retarding transparent glass panel spaced between the boxlight and the film holder to reduce radiant heat which would otherwise elevate the temperature of the negative film. Blower means separately charge the box light and isolation chamber with room temperature air from the surrounding environment and baffled vents on the upper and lower walls of the box light and isolation chamber provide means through which the charged air and its collected heat load are returned to the surrounding environment in sufficient quantity that the film holder and film mounted thereon are substantially unaffected by the heat generated by the xenon lens in the light box.

A feature of the baffled vents comprising the invention is that air can freely enter and freely exit both the box light and the isolation chamber and to do so without permitting any appreciable amount of light ingress or egress. Wherefore, in the camera mode of the apparatus the only light to enter the film compartment must come through the objective lens; and conversely, while in the projector mode no light may permeate the room other than that which is focused by the objective onto the sensitized material supported on the easel.

Many other objects, advantages and features of the invention will be apparent or will become so upon consideration of the preferred embodiment of the invention which now will be described.

DESCRIPTION OF THE DRAWINGS

Referring now to the several views of the attached drawings wherein like parts are identified by like reference numerals:

FIG. 1 illustrates one form of photoreproduction apparatus employing a pulsed light source in accordance with the present invention;

FIG. 2 is a fragmented view in side elevation of the optical head of said apparatus, portions thereof being cut away to illustrate the construction and relationship of its component parts;

FIG. 3 is a vertical view section taken along line 3—3 of FIG. 2 looking in the direction indicated by the arrows and illustrates the fore side of the film holder on which film to be projected or an auxiliary film holder may be mounted;

FIG. 4 is an elevational view of an auxiliary film holder which may be mounted on the principal film holder (FIG. 3) as when a film of smaller size and/or shape is to be projected onto the apparatus easel;

FIG. 5 is a horizontal sectional view taken along lines 5—5 of FIG. 2 looking in the directions indicated by the arrows and shows details in the construction and arrangement of the components comprising the box light and the chamber which isolates it from the film holder;

FIG. 6 is a view taken along lines 6—6 of FIG. 2 and illustrates details of the mounting of the heat retarding panel to the access door of the isolation chamber;

FIG. 7 is a view of the interior of the box light taken along lines 7—7 of FIG. 2 looking in the direction indicated by the arrows;

FIG. 8 is a view taken along lines 8—8 of FIG. 2 and illustrates the baffled vent means in the bottom wall of the box light through which the ventilating air but not the light escapes;

FIG. 9 is a view taken along lines 9—9 of FIG. 5 and illustrates details in the arrangement and structure of the baffled vents in the bottom wall of the isolation chamber;

FIG. 10 illustrates an alternative construction of baffled vents for the isolation chamber;

FIG. 11 is a rear end view of the optical head and illustrates further details thereof; and FIG. 12 is a view of the rear side of the film holder and illustrates the heat sink or shield which is mounted in the isolation chamber over the back of the film holder, the view being taken along lines 12—12 of FIG. 5.

DESCRIPTION OF THE PREFERRED EMBODIMENTS

Although it is to be understood that the present invention in a box light projection source has general application to photoreproduction apparatus, FIG. 1 illustrates one such image projector in which the invention has utility. Examples of such projectors are also disclosed in U.S. Pat. Nos. 3,734,615, 3,762,816 and 3,998,546, owned by my assignee to which reference may be had for a more complete description thereof. However, for purposes of understanding this invention and its utility, it should be understood from FIG. 1 that such an apparatus comprises an optical head indicated generally at 20 which is suspended from an overhead supporting structure 22 and is movable along tracks or rails (not shown) extending longitudinally of the top of said structure 22. In FIG. 1 said overhead supporting structure 22 is shown supported at one end by a first columnar structure 24 and at its opposite end by a second columnar structure 26 which supports a vertically disposed easel 28.

As shown in FIG. 2, its optical head 20 comprises a horizontally disposed rigid mounting plate 30 which provides rigid fixed support for a film holder embodying a vertically disposed opaque back-up plate of the film holder 32 having a rectangular shaped transparent platen 34 (FIG. 3) over which a film of a particular size or one of a plurality of auxiliary holders dimensioned for different and/or smaller size films is mounted. Supported by said plate 30 behind said back-up plate 32 is a box light 36 for rear illumination of said transparent platen 34 and film mounted thereto or indirectly by an auxiliary holder. Forwardly of the back-up plate member 32 is an objective lens 38 supported by a lens board 40 which in turn is mounted on massive-sized and rigid precisely-related tubular ways 42 which are fixed to the under side of mounting plate 30 and accommodate spatial adjustment of the objective along its optical axis toward and away from film holder 32 and more particularly the light exiting surface of the transparent platen 34. Optical head 20 as thus described is utilizable as a camera with its box light source 36 dark or as a projector with its boxlight energized. In either of said modes the spatial setting of the platen 34 from the easel 28 is adjustable to introduce a required image reduction or enlargement factor; and the spatial setting of the objective is adjustable independently of the optical head adjustment for sharpening focus of the projected image.

Considering now also FIGS. 3 and 4, it will be seen that the film holder or its back-up member 32 is provided with an 'air channel' or moat 44 in the order of 0.050 to 0.100 inches wide surrounding the periphery of its transparent platen 34 on its forward side toward easel 28 which connects via bore 46 to an evacuating pump (not shown).

Along the upper run of said channel are regularly spaced pins 48 which precisely locate cut film sections to be mounted over the platen and image projected. For this purpose as is known the film section has similarly-spaced apertures along the upper edge therof. The film sections also have a width and length greater than that of the transparent platen such that they lap said evacuating channel wherefore when located by pins 48 they are drawn into intimate conformity with the platen surface.

Differently-sized and/or shaped film sections may also be mounted over said platen 34 utilizing an auxiliary holder 50 such as illustrated by FIG. 4. As shown, such an auxiliary holder also comprises an opaque frame 52 having a transparent platen 54 provided with registration pins 56 along its upper edge and a surrounding peripherally disposed channel 58 with which the smaller or differently shaped film section may be mounted as aforesaid. Preferably, back-up plate of the film holder 32 is provided with a shelf 60 on which the auxiliary holder may be rested for convenience in mounting. The auxiliary holder 50 is also provided with appropriately located openings 62 which receive the guide pins 48 of the back-up plate when properly mounted on the film holder 32. The film holder 32 is further provided with location pins 64 at its two upper corners and the auxiliary holders have guide rings 66 which mate with said locating pins 64. When thus properly aligned, torque screws 68 in the four corners of the auxiliary holder are tightened into threaded inserts 70 provided at the four corners of the transparent platen 34 to secure the auxiliary holder 50. When thus located, its port 72 aligns with port 74 in member 32 to establish connection with bore 76 thereby connecting channel 58 of the auxiliary holder 50 to the evacuating pump. Preferably, finger recesses 80 are provided for convenience in mounting and dismounting the auxiliary holder on the back-up member of the film holder 32.

Considering now FIG. 2 with FIG. 3, it will be appreciated that operator-access to the forward side of the transparent platen 34 and/or holder 50 mounted thereover is obtained by withdrawing the film platen compartment 84 against foldable bellows 86 which connect the lens board to said film compartment. It will be further appreciated that when closed against film holder 32, the free edge of the film compartment engages a gasket 88 so as to light-seal the film compartment to the film holder 32. It may be held thereto by means such as a magnet or a suitable clamp member (not shown). Thus in the camera mode only light admitted by the objective will illuminate film mounted on the film holder within the confines of the film platen compartment.

In accordance with this invention, box light 36 is equipped with a high intensity light emitting source for example pulsed xenon lamps 360. Such a source characteristically also emits large quantities of harmful radiations including infrared and ultra violet which must be dealt with for the reasons expressed above. This is accomplished utilizing a novel ventilating system in the boxlight 36 which continuously draws room termperature air from the outside environment, collects heat generated by the lamps and discharges said air with its assumed heat load back to the surrounding environment. Also utilized therewith are means disposed between the box light and film holder 32 which effectively isolate and/or insulate the film holder (back-up member 32) and its film platen 34 from the heat generated in the boxlight and not removed by the box light ventilating system.

Referring therefore first to FIGS. 2 and 5, boxlight 36 is generally rectangular in shape having top and bottom opaque walls 361, 362, a pair of opaque sidewalls 363, an opaque rear wall 364 and an open end which faces the film holder 32 and is centered on the optical axis OA of said apparatus as is also the transparent platen 34 of the film holder 32 and the objective 38. Said open end is closed by a first transparent member or panel 366 of light diffusing material such as opal glass or white Plexiglass. The diffusing panel is removably mounted in its rigid supporting frame 367 immediately behind its open end of the boxlight in any suitable convenient manner.

Ventilation of the boxlight is obtained by a continuously operated first blower fan 368 which is mounted in its rear wall 364 and centrally thereof so as to charge the interior of the boxlight with room temperature air from the surrounding environment. Said blower fan has a balanced impeller assembly and is isolated from the boxlight itself with rubber or other dampening means to minimize vibration. As illustrated in FIG. 7, the xenon tube lamps 360 are arranged in a continuous pattern inwardly of the boxlight periphery and are backed by a reflector 369 which has a back wall spaced off the boxlight rear wall 364 and inwardly sloping sides which extend to adjacent the open end of the boxlight. When energized, the blower charges the box light with room temperature air on both sides of the reflector, entering through boxlight interior through centrally located opening 370 in the reflector and exiting into the area behind the reflector through provided openings 373, in the reflector adjacent the ends of the xenon tubes to maximize collection of generated heat. Said circulating air discharges its load through a line of spaced openings 371 in the top and bottom walls of the boxlight behind the reflector and adjacent the rear wall of the boxlight. As shown best in FIG. 8 said openings 371 are covered by an open ended channel member 372 which is light-tight sealed to the top and bottom walls 361, 362.

Said open ended channel members 372 are sometimes described as a "hat" because of their configuration in cross section. As illustrated in FIG. 8 they comprise a base wall having right-angularly disposed sidewalls and are outwardly flanged at their open side which are soldered or otherwise light-tight sealed over said lines of openings to the reflective top and bottom walls of the boxlight. Thus the heated air can reach the openings 371 for discharge only through the two open ends of the hat member. However, light rays move in straight lines and cannot turn corners wherefor if the dimensions of the base and sidewalls of the hat member of baffle 372 are properly proportioned little or no ingress or egress of light through the openings 371 is possible.

Referring back to FIGS. 2 and 5, the light emitted by the xenon tubes 360 must pass through the light diffusing panel 366 into a second or isolation chamber 90 in order to impinge on the rear surface of the transparent glass platen 34 of the film holder 32 to back light film mounted thereon for images projection to the easel 28. Said isolation chamber 90 comprises a rectangular-shaped open ended frame 900 comprising four opaque walls 901, the forward ends of which are light-tight sealed to the surrounding outer edge of the back-up member or primary film holder 32. The rear ends of said isolation chamber four walls are flanged as at 902 to receive the forward end of the box light 36 which engages gasket 903 located thereon (FIG. 5) to effect a releasable light and air tight seal between the box light and the isolation chamber.

As illustrated best in FIG. 2, the boxlight 36 is slidably supported for fore and aft movement along supporting rails 92 from which it depends; and a releasable clamp member 94 is centered between the sides of the light box and includes a knurled screw 96 which tightens into a threaded opening in aluminum block 98 fixed to the lower edge of the isolation chamber. Upon tightening screw 96, the boxlight is drawn into light- and air-tight seal with the isolation chamber. Upon loosening of said screw it is possible to withdraw the boxlight from the rear edge of the isolation chamber so as to provide operator-access into the interior of the boxlight following removal of the light diffuser. This is necessary in order to replace light tubes 360. As illustrated in FIG. 2, because the power supply 100 for exciting the xenon tubes is shown hung on the rear end of mounting plate 30, it may be necessary to remove said power supply unit 100 after first disconnecting it from the electrical power source. This however is conveniently accomplished by loosening torque screw 102 and lifting the power supply unit off the mounting plate by means of its handle.

Referring again to FIGS. 2 and 5, it will be noted that the interior of the isolation chamber is continuously charged with room temperature air by operation of a second blower 904 which is centered in the bottom wall 905 of said isolation chamber forming frame and is similarly mounted thereto as described for the first air blower. Considering also FIG. 11 with said FIGS. 2 and 5, it will be appreciated that isolation chamber blower 904 has a pipe-like intake 904a disposed at right angles to its discharge end 904b through which the blower 904 communicates with the interior of the isolation chamber 90. At 904c is an oversize cap spaced over the intake of the blower and having a depending shroud 904d about said intake providing an entrance space 904e which permits air to flow through the blower to charge the isolation chamber following a circuitous path such as to inhibit passage of light through the blower into the surrounding environment. The blower 368 for the boxlight is of similar construction and serves the same role in ventilating the boxlight 36. As illustrated in FIG. 2, the air and its collected heat load discharges through light trap vents 906 which are mounted on the upper wall 907 of said frame and through vent slots 908 in the bottom wall 909 thereof on either side of the opening 911 through which blower 904 charges the isolation chamber 90. As in the case of the light box 36, said exits through which the admitted air discharges its collected heat load are also suitably baffled to prevent ingress and egress of light therethrough. As illustrated best in FIG. 2, air striking the top wall of the isolation chamber discharges through exits 912 located at its opposed sides which communicate with light trap vents 906. Said vents 906 are shown provided with curved interior plates whose configuration effectively smooths the flow of air therethrough with minimal turbulence as it discharges over the light box. At the same time, because said vents enforce a 180° flow path, ingress and egress of light therethrough is effectively inhibited. Similarly, at the bottom of the isolation chamber, are aligned interior and exterior open-ended channel member 913, 914 having the "hat" configuration previously described, which effectively stall ingress and egress of light through opening 908. End baffles 916 may be located at either open end of the exterior hat member to maximize inpedance of light entry and discharge from the isolation chamber. Alternatively, the channel members may be arranged at right angles to each other as illustrated by FIG. 10 in which event the end baffles can be dispensed with. This latter arrangement has the advantage that it entails less obstruction to discharge of heat loaded air.

Preferably, isolation chamber 90 houses a second transparent panel 920 of heat retarding or absorbing glass. As seen in FIGS. 2 and 5, said heat retarding glass panel is fixed to an access door 921 which resiliently engages within a receiving slot in one sidewall of the isolation chamber. Upper and lower ways 923 are provided along which the upper and lower edges of said glass panel are slidably supported. As illustrated best in FIG. 6, a magnetic rubber strip 924 on either side of the access opening 922 which receives the door 921 serves to hold the access door in place once the door is pushed into the receiving slot. Said heat retarding plate 920 serves to more effectively channel the entering room temperature air through the isolation chamber. It also provides a heat barrier which shields the film positioned against the transparent platen in the image projection function. Optionally, the light diffusing panel of the box light and the heat retarding panel of the isolation chamber can be substituted one for the other.

The isolation chamber is preferably also provided with a heat sink or shield 930 shown best in FIGS. 5 and 12. Said shield 930 as there illustrated is mounted by standoffs 932 to the rear side of the subject holder 32 which is located within the isolation chamber and it is provided with a central opening illustrated in FIG. 12 corresponding to the size and shape of the transparent plate 34 of said film holder. Preferably, it is painted white or has a shiny surface to reflect heat away from the metal subject holder which supports the transparent platen 34. Being spaced therefrom it also permits convection of air between the film holding plate 32 and the heat sink plate itself.

Thus it will be apparent that the invention realizes all the objects and features thereof previously recited and in doing so makes it safe to use a pulsed xenon or similar high intensity box light—safe for the operator because it shields the light from the operator's eyes, safe in that it prevents unintentional exposure of sensitized materials and safe in that it prevents extensive overheating of films being projected.

Thus having described the invention what is claimed is:

1. In photoreproduction apparatus such as a projector or camera/rojector having a high heat intensity light source, an opaque box containing the light source and having a light transmitting wall, and a film holder having a transparent platen for holding material to be projected by said light source, the improvement comprising:

an isolation chamber located between said light transmitting wall and said film holder, said isolation chamber having a first end covered by said light transmitting wall and a second end defined by said film holder and said isolation chamber being enclosed between said first and second ends by an opaque wall confining the light which passes through the chamber from the light transmitting wall to the film holder;

a heat retarding panel is said isolation chamber, said panel being transparent and being located between said first and second ends of the isolation chamber to pass light therebetween but inhibit the transfer of heat therebetween;

blower means for directing ambient air into said isolation chamber between said light transmitting wall and said heat retarding panel and also between said heat retarding panel and said film holder to charge said isolation chamber with ambient air for cooling both sides of the panel;

vents in said opaque wall of the isolation chamber for discharging air therefrom to the surrounding environment; and light trap baffles associated with said vents which inhibit the passage of light out of said isolation chamber through the vents but which permit the discharge of air through the vents;

an apertured heat sink plate spaced from the film holder between the panel and film holder in extension about the transparent platen to reflect heat away from material supported on the film holder.

2. In photoreproduction apparatus such as a projector or camera/projector having a high heat intensity light source, an opaque box containing the light source and having a light transmitting wall, and a film holder having a transparent platen for holding material to be projected by said light source, the improvement comprising:

an isolation chamber located between said light transmitting wall and said film holder, said isolation chamber having a first end covered by said light transmitting wall and a second end defined by said film holder and said isolation chamber being enclosed between said first and second ends by an opaque wall confining the light which passes through the chamber from the light transmitting wall to the film holder;

a heat retarding panel in said isolation chamber, said panel being transparent and being located between said first and second ends of the isolation chamber to pass light therebetween but inhibit the transfer of heat therebetween;

blower means for directing ambient air into said isolation chamber between said light transmitting wall and said heat retarding panel and also between said heat retarding panel and said film holder to charge said isolation chamber with ambient air for cooling both sides of the panel;

vent in said opaque wall of the isolation chamber for discharging air therefrom to the surrounding environment; and light trap baffles associated with said vents which inhibit the passage of light out of said isolation chamber through the vents but which permit the discharge of air through the vents;

wherein the opaque box is supported from overhead tracks for axial movement into and out of light tight sealing relation with said opaque wall as said first end of the isolation chamber.

3. In photoreproduction apparatus, the combination of:

a film holder having a transparent platen on which copy to be imaged is mounted;

an objective-containing-compartment which releasably seals light tight to the forward side of the subject holder about its transparent platen;

first wall means defining an opaque box spaced behind the film holder in which is contained pulsed light emitting means having a high heat emission characteristic;

said box having an open end facing the film holder and a light diffusing panel mounted transversely of said open end;

a second wall means defining an isolation chamber between said box and film holder which is in light-tight sealed relation about the light diffusing panel and transparent platen;

a transversely extending light transmitting, heat retarding panel supported in said isolation chamber between the light diffusing panel and the transparent platen;

air blower means for moving air through the box across the pulsed light emitting means and the light diffuser panel and through the isolation chamber across the heat retarding panel;

baffled vent means in the opaque box and isolation chamber which permit discharge of air therefrom to the surrounding atmosphere while inhibiting escape of light other than through the transparent platen; and a heat shield in said isolation chamber between the film holder and heat retarding panel, said heat shielf extending about the periphery of the transparent platen.

4. The combination of claim 3 wherein the box is mounted on overhead tracks which permit moving the box toward and away from the isolation chamber, and means releasably sealing the box light-tight to the isolation chamber wall means.

5. The combination of claim 3 wherein the box contains a light reflector behind the light emitting means and extending across the width thereof, the vent means in the box being in upper and lower sidewalls thereof behind the reflector and the reflector including openings through which air flows behind the reflector for discharge through the vent means.

6. The combination of claim 3 wherein the isolation chamber has a sidewall which contains a removable door to which the heat retarding panel is fixed whereby the heat retarding panel is inserted into and removable from the isolation chamber with the door.

7. The combination of claim 3 wherein the heat shield is colored white to reflect heat, and is spaced from the film holder to permit flow of air between the heat shield and film holder.

8. In a photoreproduction apparatus, such as a camera/projector or image projector, the combination of a film holder embodying a translusent platen centered on the optical axis of said apparatus and means for supporting film in registered relation over said platen;

an opaque box axially spaced behind said film holder containing an energizable pulsed light emitting means having a high heat emission characteristic, a light reflector therebehind and a forward wall comprising a first panel of translucent material;

an isolation chamber defined at the sides, top and bottom by an opaque wall and by said first panel at one end and said transparent platen at the other end;

a second panel of transparent material located intermediately in said isolation chamber centered on the optical axis of the apparatus at a location between said film holder and first panel to define a first compartment in the isolation chamber between the first and second panels and a second compartment in the isolation chamber between the second panel and film holder;

one of said first and second panels being of light diffusing material and the other panel of heat retarding material;

air blower means for enforcing circulation of air through the box and separately through said first and second compartments of the isolation chamber, to collect heat emitted by the light emitting means; and vent means in said box and isolation chamber through which said circulated air and its collected heat discharge into the atmosphere;

said vent means including baffles which inhibit the passage of light therethrough.

9. The combination of claim 8 wherein the vent means are provided along upper and lower sides of the box behind the reflector and the reflector has openings therethrough whereby circulation of air is enforced across the light emitting means and behind the reflector.

10. The combination of claim 8 wherein the box is supported on rails which permit movement of the box into and out of closing relation with the first end of the isolation chamber, and includes clamping means which releasably lock the box to the isolation chamber in light sealing relation therewith about the first panel of light transmitting material.

11. The combination of claim 9 wherein the blower means discharges air into the isolation chamber through the bottom wall thereof, the lower edge of the second panel being spaced above said discharge of the blower means and the vent means being located in the top and bottom walls of the isolation chamber adjacent the two sides of the isolation chamber such that air circulation is enforced across the width and height of the second panel on the forward and rear sides thereof.

12. The combination of claim 11 wherein the upper and lower edges of the second panel are slidably supported in upper and lower channel members, and the second panel is mounted to an access door which is removably mounted in one sidewall of the isolation chamber, the second panel being removable with the door.

13. The combination of claim 10 wherein a heat shield member is fixed to the rear side of the film holder in spaced surrounding relation about the transparent platen.

14. The combination of claim 11 wherein the vent means in the upper wall of the isolation chamber each comprise a forward and rearwardly extended slot and an inverted channel member thereover, having an arcuate interior wall which extends through a full 180° and discharges beyond the isolation chamber.

15. The combination of claim 4 wherein the vent means in the bottom wall of the isolation chamber comprises a slot in the bottom wall thereof beneath the second panel and on either side of the blower discharge.

16. The combination of claim 15 wherein upper and lower open-ended channel member overlie each slot in facing relation wherein air which enter the open ends of the upper channel member discharges through the open ends of the lower channel member, and end baffles at either end of the lower channel member which inhibit egress and ingress of light through the vent means into the isolation chamber.

17. The combination of claim 14 wherein upper and lower open-ended channel members having both a length and width greater than the length and width of the associated slot overlie each of said slots, the upper channel member paralleling the optical axis of the apparatus and the lower channel member being at the right angles thereto to trap light as air and its heat load discharge therethrough.

18. The combination of claim 18 wherein the entrant ends of the blower means are enclosed by oversize caps having a surrounding shroud which inhibits passage of light to and from the interior of the box and the isolation chamber.

* * * * *